(12) United States Patent
Yoon

(10) Patent No.: US 8,722,190 B2
(45) Date of Patent: May 13, 2014

(54) REFLECTOR AND MANUFACTURING METHOD THEREOF

(75) Inventor: Jae-Dong Yoon, Seongnam (KR)

(73) Assignees: Alphavision Co., Ltd. (KR); Jea-Dong Yoon (KR)

( * ) Notice: Subject to any disclaimer, the term of this patent is extended or adjusted under 35 U.S.C. 154(b) by 980 days.

(21) Appl. No.: 12/513,133

(22) PCT Filed: Nov. 23, 2007

(86) PCT No.: PCT/KR2007/005957
§ 371 (c)(1),
(2), (4) Date: Apr. 7, 2010

(87) PCT Pub. No.: WO2008/063030
PCT Pub. Date: May 29, 2008

(65) Prior Publication Data
US 2010/0254012 A1 Oct. 7, 2010

(30) Foreign Application Priority Data

Nov. 24, 2006 (KR) .......................... 10-2006-0116649

(51) Int. Cl.
B32B 9/04 (2006.01)
B32B 27/36 (2006.01)
B32B 27/00 (2006.01)
G02B 5/02 (2006.01)

(52) U.S. Cl.
USPC ......... 428/411.1; 428/480; 428/500; 359/599

(58) Field of Classification Search
None
See application file for complete search history.

(56) References Cited

U.S. PATENT DOCUMENTS

| | | | |
|---|---|---|---|
| 5,411,805 A | 5/1995 | Magill | 428/411.1 |
| 5,844,731 A | 12/1998 | Kabumoto et al. | 359/869 |
| 7,834,955 B2 | 11/2010 | Suzuki et al. | 349/67 |
| 2002/0015807 A1 | 2/2002 | Sugino et al. | 428/1.31 |
| 2002/0122252 A1 * | 9/2002 | Hebrink et al. | 359/498 |

FOREIGN PATENT DOCUMENTS

| | | |
|---|---|---|
| EP | 1 703 305 A2 | 9/2006 |
| JP | 6362104 | 3/1988 |
| JP | 06322153 | 11/1994 |
| JP | 07118433 | 5/1995 |
| JP | 10-45930 | 2/1998 |
| JP | 2004-14268 | 1/2004 |
| JP | 2005-120140 | 5/2005 |
| JP | 2006-051804 | 2/2006 |
| JP | 2006051804 | 2/2006 |
| KR | 10-1985-0001813 | 4/1985 |
| KR | 1019850001813 | 4/1985 |
| KR | 1020010113559 | 12/2001 |
| KR | 1020020060179 | 7/2002 |
| KR | 1020050038152 | 4/2005 |
| KR | 1020050049077 | 5/2005 |
| KR | 1020050056303 | 6/2005 |
| KR | 1020050073462 | 7/2005 |
| KR | 1020050121578 | 12/2005 |
| KR | 1020060029391 | 4/2006 |
| KR | 1020060061932 | 6/2006 |
| KR | 1020060089434 | 8/2006 |
| KR | 1020060095361 | 8/2006 |
| KR | 1020060134020 | 12/2006 |
| WO | WO 97/01117 | 1/1997 |
| WO | WO 2005/066664 A1 | 7/2005 |

OTHER PUBLICATIONS

Office Action for Japanese Pat. Appln. No. 2009-538334, dated May 26, 2010.
Supplementary European Search Report for EP Pat. Appln. No. 07 834 255.7, dated Nov. 29, 2011 and mailed Dec. 7, 2011.
International Search Report for PCT/KR2007/005957 dated Feb. 22, 2008.

* cited by examiner

*Primary Examiner* — Sheeba Ahmed
(74) *Attorney, Agent, or Firm* — Cantor Colburn LLP

(57) ABSTRACT

Provided are a reflector that reflects incident light and comprises crystalline plastic in which a crystal region and an amorphous region are mixed, wherein the amorphous region includes a plurality of orientation layers comprising amorphous particles that are oriented in a predetermined direction, and a method of manufacturing the same. The reflector, which has high reflectance, is formed by extending a crystalline plastic material exhibiting a superior extensibility to extend the amorphous particles in the amorphous region in the predetermined direction so as to form a plurality of extension layers in the amorphous region. According to the present invention, since a reflector having a superior performance with a very improved reflectance can be provided due to a high diffuse reflectance by the extension layers in the amorphous region without a foaming process or an additional additive to increase the reflectance, the manufacturing process of the reflector is simplified and the manufacturing cost is reduced so that productivity can be greatly improved.

8 Claims, 15 Drawing Sheets

MCPET

REFLECTOR AND MANUFACTURING METHOD THEREOF

CLAIM OF PRIORITY

This application claims priority under 35 U.S.C. §371 to International Application No. PCT/KR2007/005957, filed on Apr. 9, 2007, which claims priority to Korean Patent Application No. 10-2006-0116649, filed Nov. 24, 2006, each of which is incorporated by reference in its entirety.

TECHNICAL FIELD

A reflector and a method of manufacturing a reflector of a light source such as a fluorescent lamp or a backlight of a liquid crystal display (LCD) are described herein.

BACKGROUND ART

Conventional methods of manufacturing a reflector of a light source can be classified into a method using a whiter pigment/dye additive and a method including generating air bubbles in a film.

Korean Patent No. 611599 entitled "White Film For Surface Light Source Reflection Member" discloses a white film including air bubbles, for a reflection member of a surface light source in which a coating layer including a light stabilizer is formed at least one side of the white film. Since the white film exhibits a low degradation in brightness over a period of time despite heavy usage and can maintain a high quality image for a long time, it can be preferably used for an edge light of an LCD screen, a reflector of a surface light source of a direct type light, and a member used for a reflector.

An edge light type that uses a cold cathode ray tube as an illumination light source and the light that can be illuminated form a edge of a light guide plate is widely used as an illumination member of a liquid crystal screen (Japanese Patent Publication No. 63-62104). To illuminate the liquid crystal screen, in order to efficiently use light, a reflector is installed around the cold cathode ray tube. Also, to efficiently reflect light diffused by the light guide plate toward the liquid crystal screen, a reflector is installed under the light guide plate.

For a large screen such as an LCD television, since high screen brightness cannot be provided using the edge light method, a direct type light method is used. According to the direct type light method, the cold cathode ray tubes are arranged parallel to each other above a reflector. A flat shape or one obtained by molding a portion of the cold cathode ray tube in a semicircular groove shape is used as the reflector.

Also, since the surface light source reflection member such as the reflector or the reflector used for a surface light source of an LCD device needs a high reflection function, a film containing a white pigment with a white pigment or white dyes, a film including micro-bubbles, or a metal plate or plastic plate to which the film is added. In particular, a film including micro-bubbles is widely used because it can provide good improvement of brightness or regularity (uniformity). Japanese Patent Publication No. hei 6-322153 and Japanese Patent Publication No. hei 7-118433 each disclose a film including micro-bubbles. These publications concern technologies related to 1) mono-axial extension or biaxial extension after adding film forming resin and incompatible resin, 2) mono-axial extension or biaxial extension after adding organic/inorganic particles, 3) extrusion sheet molding using foaming gas, and 4) foaming by injecting gas in an extrusion sheet.

Recently, micro-foaming polyethylene terephthalate (MC-PET) products of Furukawa are widely used as a material for reflectors for backlights of LCD devices. The MCPET products have a high light reflectance by micro-foaming polyethylene terephthalate (PET) resin of a pet bottle material to form a plurality of micro-bubbles in a sheet. The following Korean patent applications are related to the above-described MCPET products.

(1) Korean Patent Application No. 10-2003-0073384 entitled "Backlight Unit";

(2) Korean Patent Application No. 10-2003-0082948 entitled "LCD Module";

(3) Korean Patent Application No. 10-2003-0089231 entitled "LCD Device Backlight Assembly";

(4) Korean Patent Application No. 10-2004-0100558 entitled "LCD Device And Manufacturing Method Thereof";

(5) Korean Patent Application No. 10-2004-0046746 entitled "Backlight Unit";

(6) Korean Patent Application No. 10-2004-0078310 entitled "Optical Film And Backlight Unit Having The Same";

(7) Korean Patent Application No. 10-2005-7005358 entitled "Optical Reflector And Manufacturing Method Thereof";

(8) Korean Patent Application No. 10-2005-0010677 entitled "Backlight Assembly And Display Device Having The Same"; and (9) Korean Patent Application No. 10-2005-0016992 entitled "Backlight Unit And LCD Device".

Products commercialized using the above conventional material for a reflector for a surface light source and major characteristics thereof are shown in Table 1 below.

TABLE 1

| Manufacturer | Teijin Dupont | Teijin Dupont | Toray | Mitsui | Furukawa |
|---|---|---|---|---|---|
| Product Name | TDFJ UX-100 | TDFJ UX-150 | PET-188 | PP(polypropylene)-100 | MCPET |
| Thickness | 100 μm | 150 μm | 188 μm | 100 μm | 940 μm |
| Density | 1.2 | 1.2 | 1.0 | | 0.27 |
| Reflectance | 97.6 | 98.6 | 97.2 | 98 | 97.9 |
| Manufacturing Technology | CO-PET + pigment | CO-PET + pigment | PET + TPX (polymethyle pentene) | PP(polypropylene) + filter + extension | PET + gas |
| Others | Heat treatment + polishing process apply | | | | |

FIG. 1 illustrates the structure of each of the commercialized products of Table 1. The conventional products shown in FIG. 1 and Table 1 obtain a desired reflectance by added pigment/dyes, forming air bubbles inside, and extending pores through extension after adding an additive.

FIG. 2 illustrates the principle of diffuse reflection of a reflector. Total reflection is a total of mirror reflection and diffuse reflection. Mirror reflection of light occurs when light is directly reflected from a surface of a reflector so that a reflected wave proceeds in a particular direction. Diffuse reflection occurs when light incident on micro-bubbles, white pigments, and crystalline particles in a reflector is reflected in all directions and externally emitted. A degree of the diffuse reflection is determined by the numbers of the micro-bubbles, the white pigments, and the crystalline particles in the reflector. In an LCD, it is advantageous to have a higher diffuse reflectance.

The conventional products of Teijin Dupont, Toray, and Mitsui using the white pigment/dyes additive have reflectors which are manufactured using an additive such as $CaCO_3$ or $BaSO_4$ having a relatively superior reflectance. The reflectors are manufactured to be thin because of the material costs of the white pigment/dyes additive. That is, when the thickness of the reflector increases, the amount of the white pigment/dyes additive included in the reflector increases accordingly, which radically increases the overall material cost. When the reflector is manufactured to be thin, the overall size of the reflector is limited. That is, when the overall size of the reflector only is increased in a state in which the reflector is thin, the reflector is twisted or warped by heat when used for a long time or may not have a sufficient structural strength so that it cannot be applied to a large screen TV over 42 inches.

To address the above problem, the foaming product of Furukawa can be manufactured to be thick and applied to a large screen TV over 42 inches. However, in order to foam PET, a gas absorption process that is performed in a high-pressure gas tank for 48 hours is needed, thereby increasing production costs. Also, it is difficult to reduce a production time for the foaming product.

DETAILED DESCRIPTION OF THE INVENTION

Technical Problem

Provided herein is a reflector having high reflectance, which can be manufactured using a relatively simple method, thereby reducing manufacturing costs and increasing productivity.

Technical Solution

According to an aspect of what is described herein, there is provided a reflector that reflects incident light and is produced by crystalline plastic in which a crystalline region and an amorphous region are mixed, wherein the amorphous region comprises a plurality of orientation layers comprising amorphous particles that are oriented in a single predetermined direction.

The orientation layers are arranged in the predetermined direction.

The orientation layers are arranged in a thickness direction that is perpendicular to the predetermined direction.

The crystalline plastic is a polyester family or polyolefin family.

The reflector has a reflectance of 95% or more.

The reflector further comprises a UV stabilizer.

The content of the UV stabilizer is 0.05-5 wt %.

The UV stabilizer comprises an organic-based light stabilizer or an inorganic-based light stabilizer such as sol-gel.

According to another aspect of what is described herein, there is provided a method of manufacturing a reflector, comprising arranging amorphous particles in an amorphous region of crystalline plastic in a single predetermined direction so that a plurality of orientation layers are formed in the amorphous region by extending the crystalline plastic in the predetermined direction at a temperature below the crystallinelization temperature Tc of the crystalline plastic.

The method further comprises forming an extrusion sheet by inputting pellets constituting a material in an amorphous state of the crystalline plastic to an extrusion molder, cooling the extrusion sheet exhausted from the extrusion molder at a temperature below the crystallization temperature of the crystalline plastic using a cooling roll, and extending the extrusion sheet by inputting the extrusion sheet to an extrusion chamber so that the amorphous particles in the amorphous region are oriented in the predetermined direction.

The method further comprises preparing a sheet of a crystalline plastic material for extension, and extending the sheet by inputting the sheet to an extrusion chamber at a temperature below the crystallization temperature of the crystalline plastic so that the amorphous particles in the amorphous region are oriented in the predetermined direction.

The orientation layers are arranged in the predetermined direction.

The orientation layers are arranged in a thickness direction that is perpendicular to the predetermined direction.

The crystalline plastic is a polyester family or polyolefin family.

A reflectance of the reflector is 95% or more.

The method further comprises adding a UV stabilizer to the extrusion molder.

The content of the UV stabilizer is 0.05-5 wt %.

The UV stabilizer comprises an organic-based light stabilizer or an inorganic-based light stabilizer such as sol-gel.

Advantageous Effects

A reflector having a high reflectance is provided by extending a crystalline plastic material exhibiting a superior extensibility to allow amorphous particles provided in a amorphous region to be extended in a predetermined direction so as to form a plurality of extension layers in the amorphous region. Since a reflector having a superior performance with a very improved reflectance can be provided due to a high diffuse reflectance by the extension layers in the amorphous region without a foaming process or an additional additive to increase the reflectance, the manufacturing process of the reflector is simplified and the manufacturing cost thereof is reduced so that productivity can be greatly improved.

The reflector manufactured is very suitable for reflectors of various illuminations, in particular, for edge lights of LCDs and, reflectors of surface light sources of direct type lights.

BEST MODE

Figure 1:
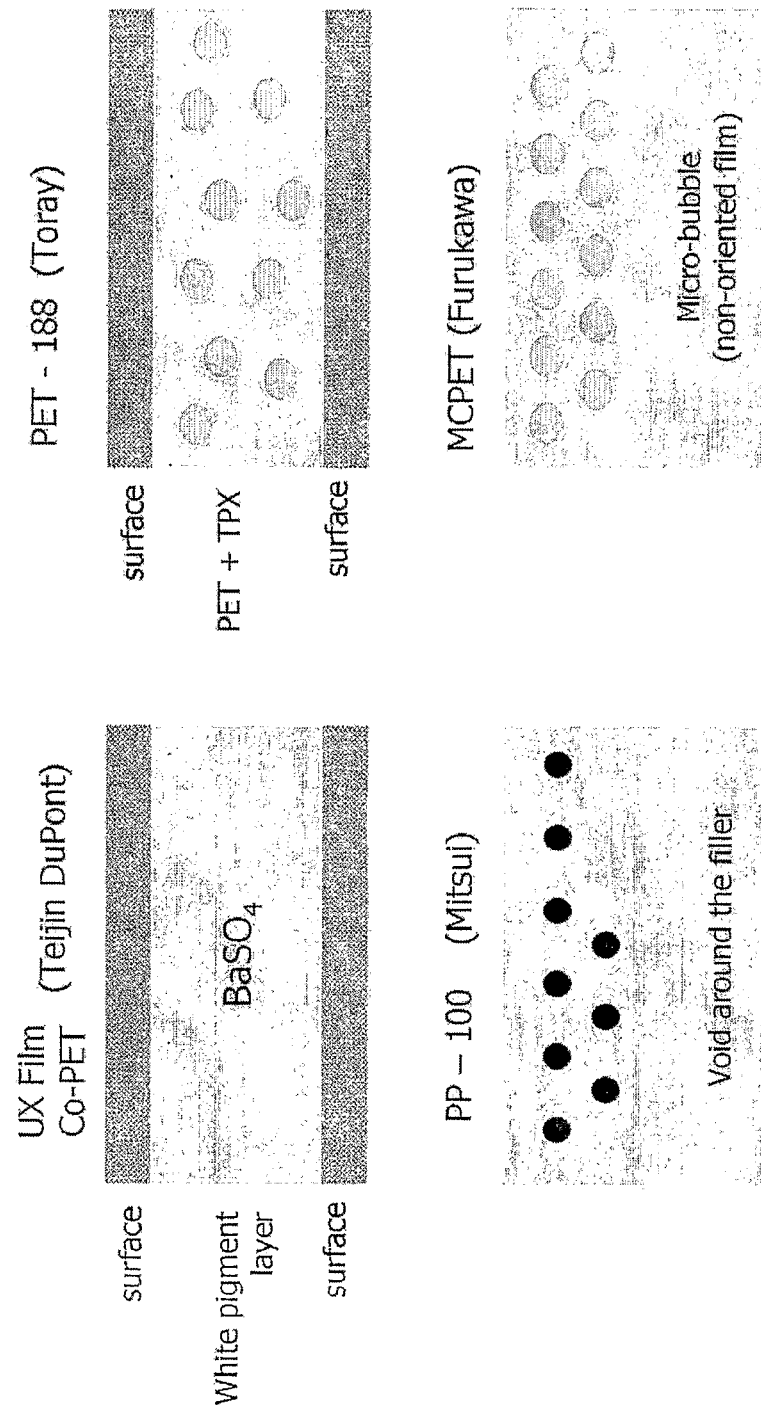
FIG. 1 illustrates the structure of each of a plurality of commercialized reflector products for surface light sources, formed of conventional material.
Figure 2:
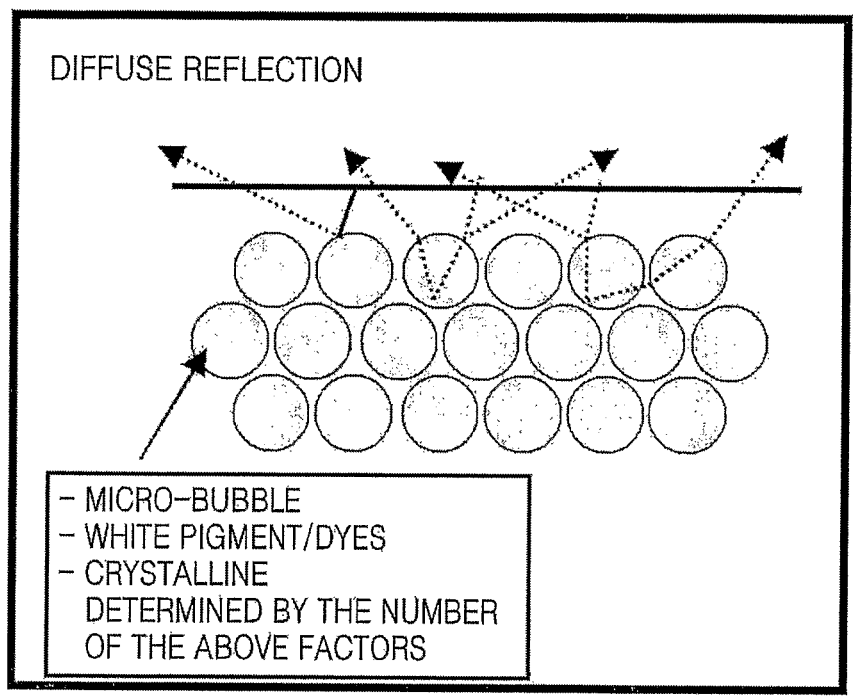
FIG. 2 illustrates the principle of diffuse reflection of a reflector.

Hereinafter, preferred embodiments of the invention will be described with reference to the attached drawings. Like reference numerals in the drawings denote like elements. Also, the term "sheet" used in the present specification can be either a sheet of a plate member type or a roll member type that is wound in a roll type and can be continuously supplied.

Also, in the present specification, the term "one direction" refers to a direction in which a sheet is extended and the term "thickness direction" refers to a direction along the thickness of a sheet, which is perpendicular to the "one direction". These directions are indicated in FIG. 3.

Figure 3:
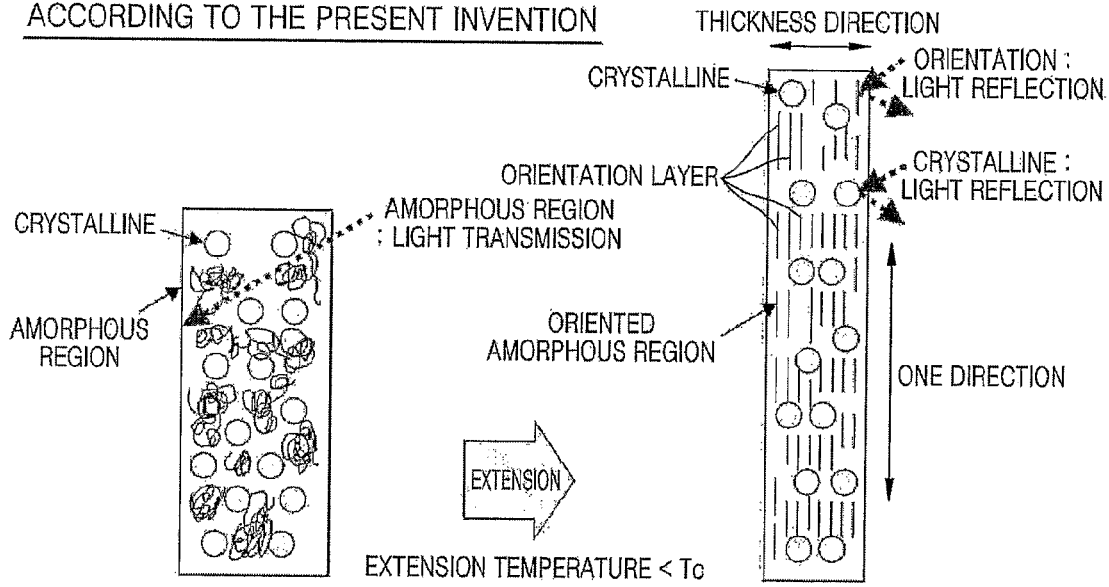
FIG. 3 illustrates the principle of reflection of a reflector manufactured using a method of low temperature extension of crystalline plastic, according to an embodiment of what is described herein.

FIG. 3 illustrates the principle of reflection of a reflector manufactured of crystalline plastic according to an embodiment of what is described herein. The reflector includes a crystal region and an amorphous region which are mixed. In detail, the reflector is manufactured by low-temperature extension of crystalline plastic at an extension temperature below a crystallization temperature Tc. The crystalline plastic maintains a semi-transparent state before extension. Referring to FIG. 3, while the crystal region and crystals of the reflector material (neat PP) before extension diffusely reflect light, the amorphous region in which amorphous particles are irregularly arranged transmits light so that the overall reflector is in a semi-transparent state. However, when the reflector is low-temperature extended in a predetermined direction at a temperature below the crystallization temperature Tc, the amorphous particles in the amorphous region existing in a transformable state at a temperature below the crystallization temperature are oriented so that a plurality of orientation layers (indicated as lines in FIG. 3) are formed in the amorphous region. When the extension is performed at a temperature below the crystallization temperature Tc, diffuse reflection occurs in the crystal region in a reflection capability state. Furthermore, incident light is reflected by the orientation layers in the amorphous region where no reflection has occurred, thus obtaining a high reflectance. The orientation layers are arranged in the predetermined direction (please refer to FIG. 3) and a thickness direction (shown in FIG. 3) perpendicular to the direction so that most of the incident light can be reflected by the reflector. Also, it is preferable to appropriately extend the crystalline plastic such that the reflectance of the reflector used in the present embodiment can be about 95% or more.

Figure 4:
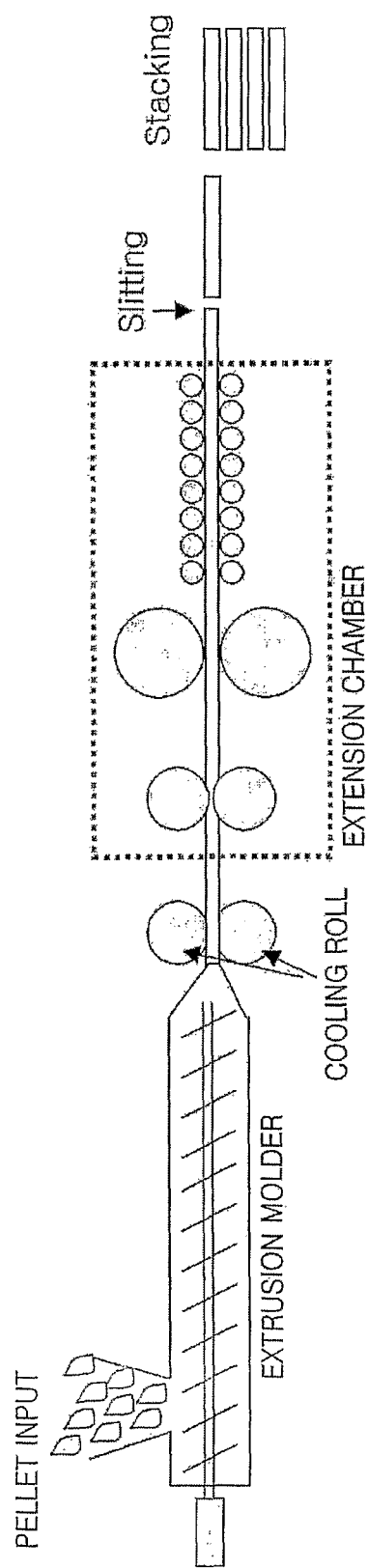
FIG. 4 is a diagram for describing a method of manufacturing a reflector by low temperature extension of crystalline plastic, according to an embodiment of the what is described herein.

FIG. 4 is a diagram for describing a method of manufacturing a reflector by low temperature extension of crystalline plastic, according to an embodiment of what is described herein. First, pellets constituting an amorphous state of a crystalline plastic material are input to an extruder. The crystalline plastic material is preferably a polyester family such as PET (polyethylene terephthalate), PEN (polyethylene 2,6-naphthalate), or PNT (polybutylene terephthalate), or a polyolefin family such as PP (polypropylene), PE (polyethylene), HDPE (high density polyethylene), LDPE (low density polyethylene), or LLDPE (linear low density polyethylene).

When resin in the polyolefin family is used, it is preferable to add a UV (ultraviolet) stabilizer to prevent yellowing after UV exposure. The UV stabilizer includes an organic based light stabilizer such as a hindered amine family, a salicylic acid family, a benzophenone family, a benzotriazole family, an anoacrylate family, a triazine family, a benzoate family, or an oxalic acid anilide family, and an inorganic based light stabilizer such as sol-gel. Detailed examples of the UV stabilizers are shown below.

Hindered amine family: bis(2,2,6,6-tetramethyl-4-piperidyl)sebacate, succinic acid dimethyl•1-(2-hydroxyethyl)-4-hydroxy-2,2,6,6-tetramethylpiperidyn polycondensation product Salicylic acid family: p-t-butylphenylsalicylate, p-octylphenylsalicylate Benzophenone family: 2,4-dihydroxybenzophenone, 2-hydroxy-4-methoxybenzophenone, 2-hydroxy-4-methoxy-5-sulfobenzophenone, 2,2'-4,4'-tetrahydroxybenzophenone, 2,2'-dihydroxy-4-methoxybenzophenone, 2,2'-dihydroxy-4,4'-dimethoxybenzophenone, bis(2-methoxy-4-hydroxy-5-benzoylphenyl)methane Benzotriazole family: 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2,(2'-hydroxy-3',5'-di•t-butylphenyl)-5-chlorobenzotriazole, 2-(2'-hydroxy-5'-t-octylphenol)benzotriazole, 2-(2'-hydroxy-3',5'-di•t-amilphenyl)benzotriazole, 2-2'-methylenbis[4-(1,1,3,3-tetramethylbutyl)-6-(2H-benzotriazole-2-one)phenol], 2-(2'hydroxy-5'-metaacryloxyphenyl)-2H-5-benzotriazole, 2-[2'-hydroxy-3'-(3',4',5',6'- tetrahydrophthalimidnietyl)-5'-methylphenyl)benzotriazole, 2-(2'-hydroxy-5-acryloyloxyethylphenyl)-2H-benzotriazole, 2-(2'-hydroxy-5'-metacryloxyethylphenyl)-2H-benzotriazole, 2-(2'-hydroxy-3'-t-butyl-5'-acryloylethylphenyl)-5-chloro-2H-benzotriazole, Cyanoacrylate family: ethyl-2-cyano-3,3'-diphenylacrylate Others: Nickelbis(octylphenyl)sulfide, [2,2'-thiobis(4-t-octylphenolato)-n-butylaminnickel, nickelcomplex-3-5-di•t-butyl-4-hydroxybenzil•phosphomonoethylate, nickel•dibutyldithiocarbamate, 2-4-di-t-butylphenyl-3',5'-di-t-butyl-4'-hydroxybenzoate, 2,4-di•t-butylphenyl-3',5'-di•t-butyl-4'-hydroxybenzoate, 2-ethoxy-2'-ethyloxalicacidbisanylide, 2-(4,6-diphenyl-1,3,5-triazine-2-one)-5-[(hexyl)oxy]-phenol It is preferable to use at least one of the hindered amine family, the benzophenone family, and the benzotriazole family, and more preferably, a combination thereof.

Of the above-described UV stabilizers, the type of the UV stabilizer that is added varies according to the specification of a reflector or the amount of the UV stabilizer can be appropriately determined within a range of 0.05 wt % through 5 wt %. When the amount of the UV stabilizer is not greater than 0.05 wt %, a yellowing removal effect is degraded, which is not preferable. When the amount of the stabilizer is not less than 5 wt %, the overall cost increases and strength is degraded, which is not preferable. The UV stabilizer is mixed with a crystalline plastic base member at an appropriate addition rate and the compound is extruded by an extrusion molder to mold an extrusion sheet.

The extrusion sheet exhausted from the extrusion molder is cooled down at a temperature below the crystallization temperature of the crystalline plastic by passing through a cooling roll.

After passing through the cooling roll, the extrusion sheet is input to an extension chamber to extend the amorphous region such that amorphous particles in the amorphous region can be oriented in one direction. In the extension process, the reflector may be manufactured in a variety of forms according to the required product specifications such as the purpose of use, reflectance, thickness, and manufacturing costs of the reflector plate.

In the method of manufacturing a reflector according to an embodiment of what is described herein, without the extrusion molder process and cooling roll process described with reference to FIG. 4, the reflector can be manufactured with only the operations of preparing a sheet in a roll member formed of crystalline plastic from the start and inputting the prepared sheet to the extension chamber at a temperature below the crystallization temperature Tc to extend the prepared sheet. The reflector exhausted from the extension chamber is slit according to the purpose of use/product specification. However, when a sheet in a separate plate shape is input to the extension chamber, the slitting process can be omitted. Then, the reflector is stacked according to a packaging standard, thus completing the reflector manufacturing process.

Table 2 below shows the comparison of major characteristics between an SPP (stretched polypropylene) reflector manufactured using a low temperature extension method according to an embodiment of what is described herein and conventional products. The SPP product manufactured using the method of described herein uses PP (polypropylene) as the crystalline plastic material.

TABLE 2

| Manufacturer | Teijin Dupont | Teijin Dupont | Toray | Mitsui | Furukawa | Present Invention |
|---|---|---|---|---|---|---|
| Product Name | TDFJ UX-100 | TDFJ UX-150 | PET-188 | PP-100 | MCPET | SPP |
| Thickness | 100 μm | 150 μm | 188 μm | 100 μm | 940 μm | 800 μm |
| Density | 1.2 | 1.2 | 1.0 | | 0.27 | 0.75 |
| Reflectance | 97.6% | 98.6% | 97.2% | 98% | 97.9% | 99% or more |
| Manufacturing Technology | CO-PET + pigment | CO-PET + pigment | PET + TPX | PP + filter + extension | PET + gas | Extension Orientation of Crystalline plastic |

Figure 5:
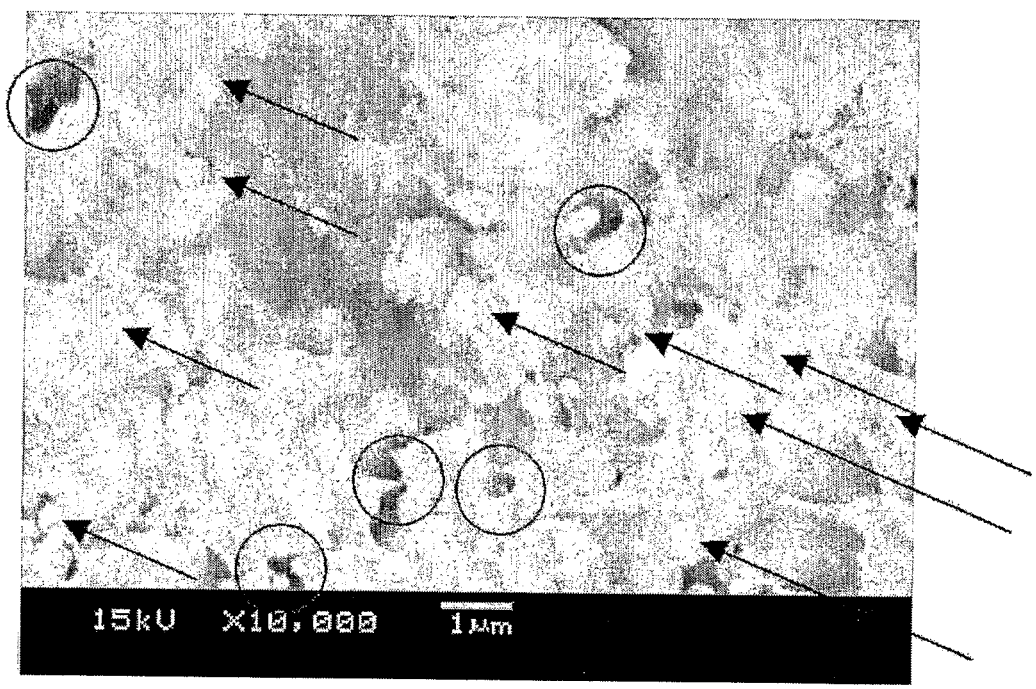
FIG. 5 is a 10,000 times magnified scanning electro-microscope (SEM) image of a section of the UX film of Teijin Dupont.

FIG. 5 is a 10,000 times magnified SEM (scanning electromicroscope) image of a section of the UX film of Teijin Dupont. In the image, arrows indicate BaSO$_4$ particles that are white pigments used as a 10-20% additive and circles indicate pores of about 1 to several micrometers in size generated around the additive due to the extension. The UX film obtains a desired reflectance according to the numbers of the BaSO$_4$ particles and pores.

Figure 6:
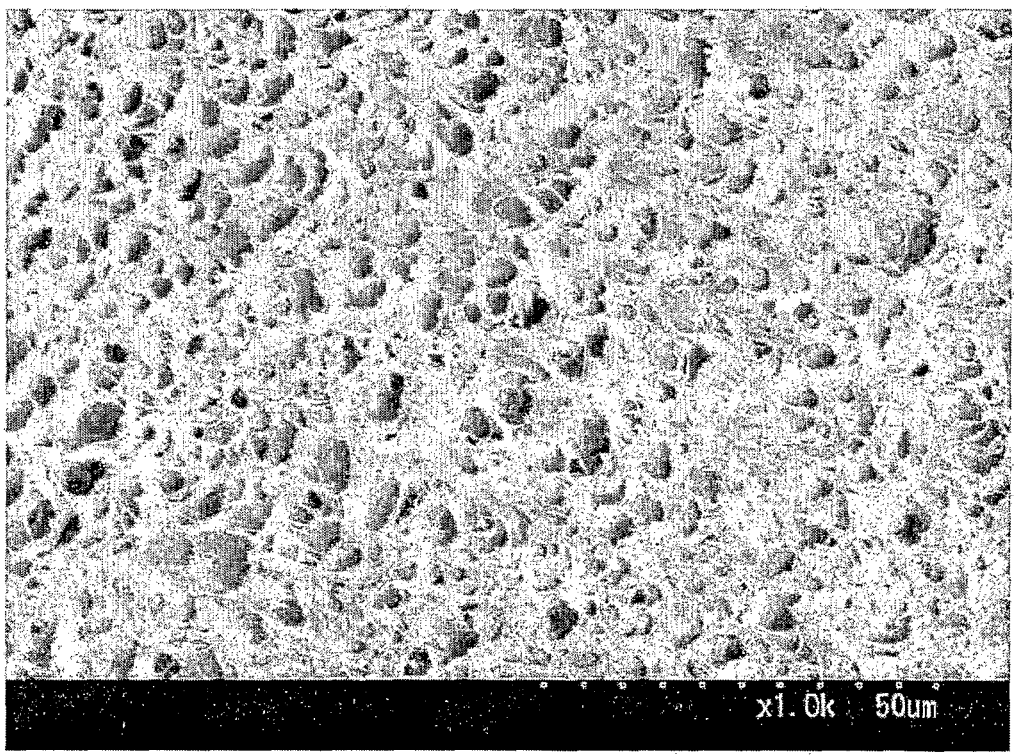
FIG. 6 is a 1,000 times magnified SEM image of the MCPET product of Furukawa.

FIG. 6 is a 1,000 times magnified SEM image of the MCPET product of Furukawa. In the MCPET image, a large number of micro-bubbles having a size of tens of micrometers can be observed. The MCPET obtains a desired reflectance due to the micro-bubbles.

Figure 7:
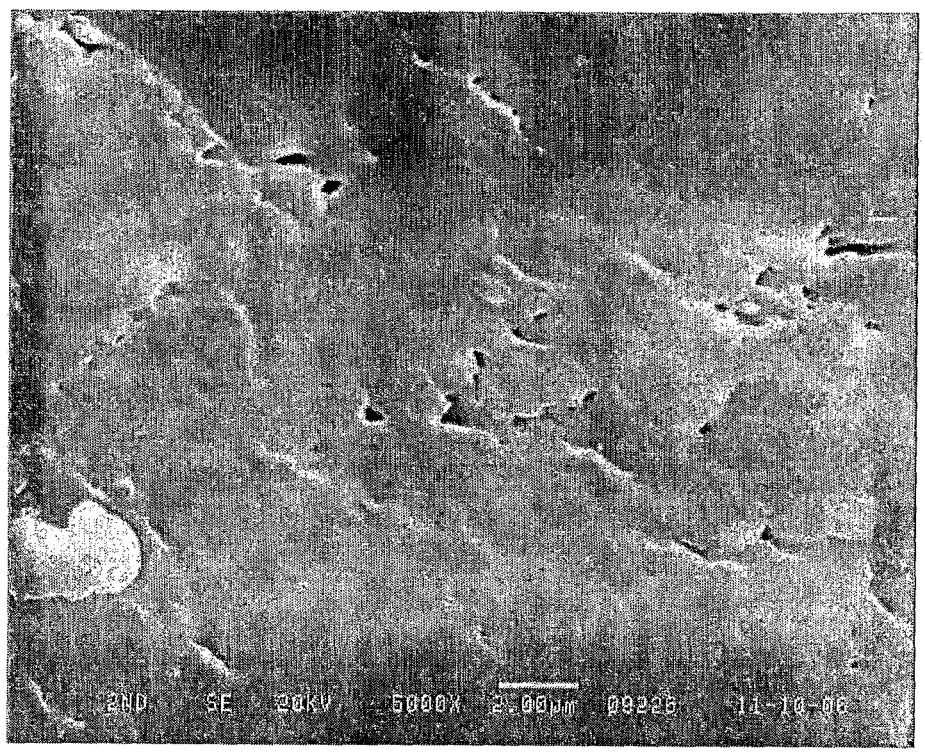
FIG. 7 is a 10,000 times magnified SEM image of a section perpendicular to the extension direction of a PP material reflector manufactured by low temperature extension at a temperature below a crystallization temperature, according to en embodiment of what is described herein.
Figure 8:
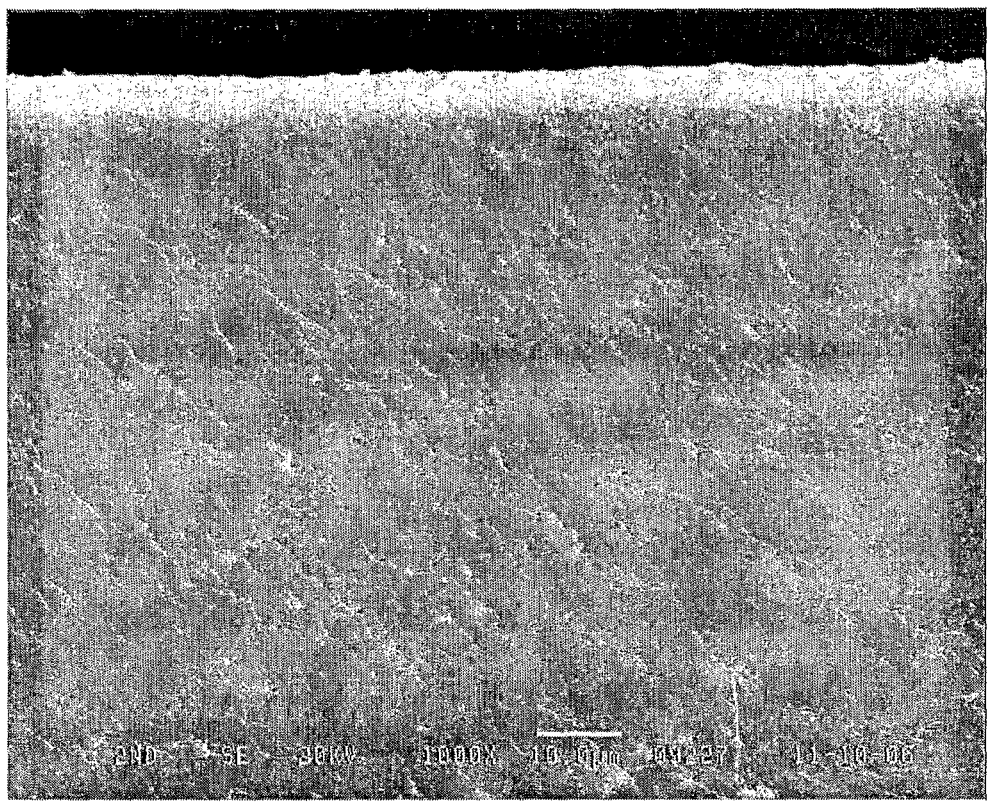
FIG. 8 is a 1,000 times magnified SEM image of a section perpendicular to the extension direction of a PP material reflector manufactured by low temperature extension at a temperature below a crystallization temperature, according to an embodiment of what is described herein.
Figure 9:
FIG. 9 is a 10,000 times magnified SEM image of a section parallel to the extension direction of the PP material reflector manufactured by low temperature extension at a temperature below a crystallization temperature, according to an embodiment of what is described herein.

FIG. 7 is a 10,000 times magnified SEM image of a section perpendicular to the extension direction of a PP material reflector manufactured by low temperature extension at a temperature below a crystallization temperature, according to an embodiment of what is described herein. FIG. 8 is a 1,000 times magnified SEM image of the same. FIG. 9 is a 10,000 times magnified SEM image of a section parallel to the extension direction of the PP material reflector manufactured by low temperature extension at a temperature below a crystallization temperature, according to an embodiment of what is described herein.

Referring to FIG. 7, very fine and irregular spaces less than 1 μm in size generated as a boundary between crystal and amorphous regions are broken in a process of forming a plurality of orientation layers in the amorphous region by the low temperature extension. Such phenomenon is observed only in the image of a section perpendicular to the extension direction. These spaces can contribute to the diffuse reflectance of the reflector of FIG. 7.

Referring to FIG. 8, compared to the MCPET product of FIG. 6, spaces similar to micro-bubbles are not observed and a plurality of orientation layers formed in the amorphous region are observed. The structure in which the orientation layers formed in the amorphous region are oriented in one direction becomes a major factor to determine the reflectance of a reflector.

Referring to FIG. 9, a structure in which pores are not observed and the amorphous region is oriented can be clearly shown. Although pores can be observed in every section of the conventional reflectors shown in FIGS. 1, 5, and 6, in the reflector, pores are not observed at all in a section parallel to the extension direction. The orientation layers in a line shape formed in the amorphous region of the reflector of the present invention manufactured of the crystalline plastic material using the low temperature extension method is a major factor in determining the reflectance of the reflector.

Figure 10:
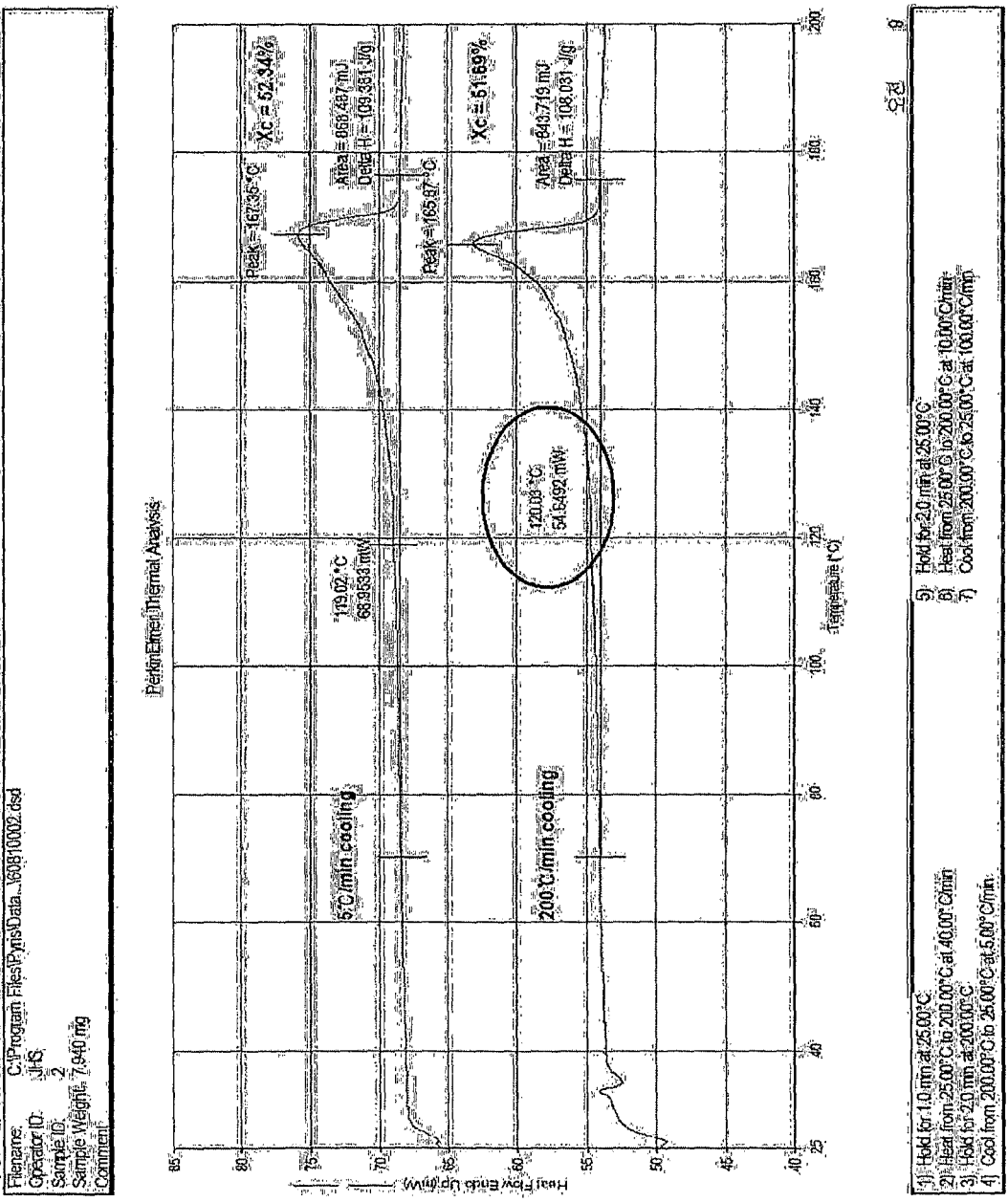
FIG. 10 is a graph showing results of a test of the crystallization temperature of the PP used as crystalline plastic in an embodiment of what is described herein.

FIG. 10 is a graph showing results of a test of the crystallization temperature of PP used as the crystalline plastic in an embodiment of what is described herein. A circle indicates the crystallization temperature of the PP of 120° C. The crystallization temperatures of materials, for example, PET (polyethylene terephthalate) and PE (polyethylene) used as reflector materials in the present invention are 160.8° C. and 70° C., respectively. Thus, the reflectance is improved by low temperature extending the crystalline plastic at a temperature below the crystallization temperature to orient the amorphous region.

Figure 11:
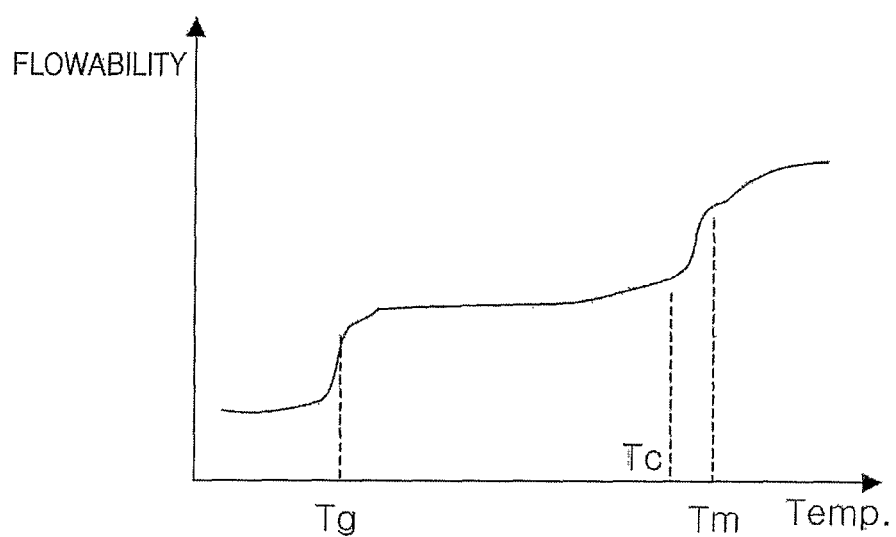
FIG. 11 is a graph showing the analysis of flowability of a crystalline plastic according to an embodiment of what is described herein using differential scanning calorimetry (DSC)

FIG. 11 is a graph showing the analysis of flowability of a crystalline plastic according to an embodiment of what is described herein using differential scanning calorimetry (DSC). A melting temperature Tm is a temperature at which the crystalline plastic becomes liquid. The crystallization temperature Tc is a temperature at which crystallization is complete so that the crystalline plastic is in a completely solid state. A glass transition temperature Tg is a temperature at which an amorphous portion of the crystal plastic is melted. In a conventional method of manufacturing a reflection film, a sheet having a particular thickness is extruded and, before the sheet is completely hardened, that is, the temperature is dropped from the melting temperature Tm to the crystallization temperature Tc, the sheet is extended in a predetermined direction or in a direction perpendicular to the predetermined direction to manufacture a reflector. In contrast, using the low temperature extension manufacturing method, a sheet of a crystal material hardened at a temperature below Tc is extended.

Figure 12:
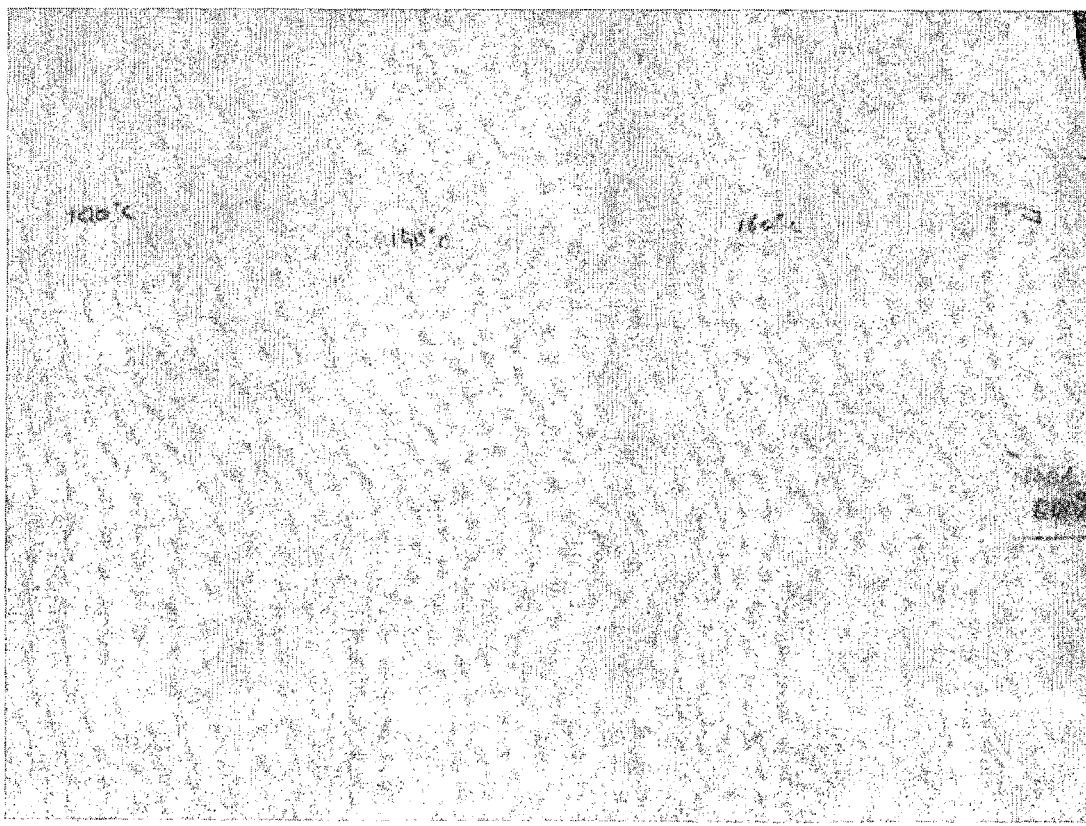
FIG. 12 is a photographic image showing the comparison of characteristics of a reflector product formed of PP material according to varying extension temperatures of the PP material.

FIG. 12 is a photographic image showing the comparison of characteristics of a reflector product formed of PP material according to extension temperatures of 140° C., 150° C., 160° C., and 120° C. from the left. The PP material extended at temperatures of 140° C., 150° C., and 160° C. which are above the crystallization temperature (PP: 120° C.) is formed to be wide, thin, and semitransparent like a conventional film. In contrast, the PP material extended at 120° C. on the right side of the image is formed to be relatively very small, white, and semitransparent. That is, when the PP material is extended at the temperatures of 140° C., 150° C., and 160° C. above the crystallization temperature without an additive, the crystalline plastic is not suitable for use as a reflector. Thus, to obtain a reflectance satisfying the specification of the reflector, an additive needs to be added by several tens of percent. In contrast, according to the low temperature extension of what is described herein, that is, extension at a temperature below Tc, the amorphous particles in the amorphous region are oriented in a predetermined direction and the orientation layers are formed so that a reflector exhibiting superior reflectance can be obtained. Thus, sufficient reflectance can be obtained without the addition of a separate additive.

Figure 13:
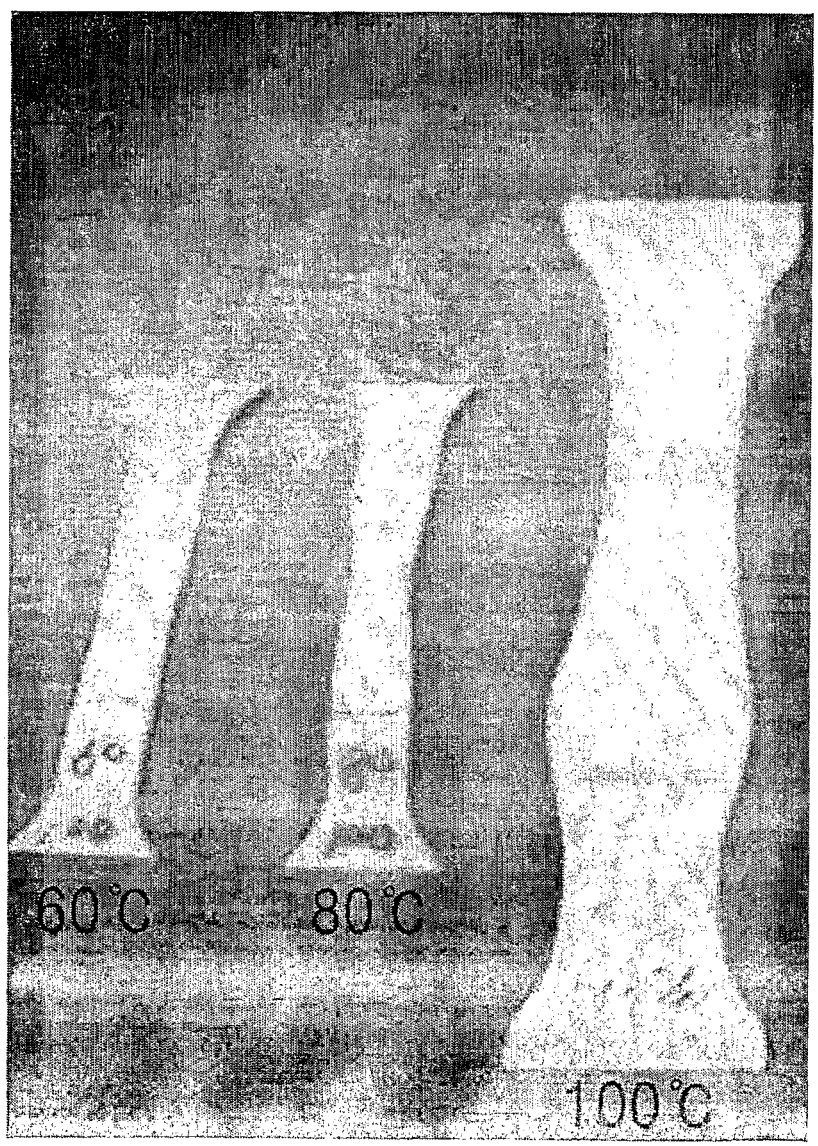
FIG. 13 is a photographic image showing the results of extensions of PP material according to varying extension temperatures.

FIG. 13 is a photographic image showing the results of different extensions of PP material at temperatures of 60° C., 80° C., and 100° C. from the left, respectively. The tensile forces applied for each extension temperature are shown in Table 3 below.

TABLE 3

| Extension Temperature | Tensile Force |
| --- | --- |
| 100° C. | 101.46 kgf/cm$^2$ |
| 80° C. | 105.51 kgf/cm$^2$ |
| 60° C. | 158.99 kgf/cm$^2$ |

A reflector having a suitable final thickness to obtain a desired reflectance can be manufactured by appropriately selecting the extension temperature and the tensile force as an extension condition of an extension chamber according to the size and thickness of the original crystalline plastic material before the extension.

Figure 14:
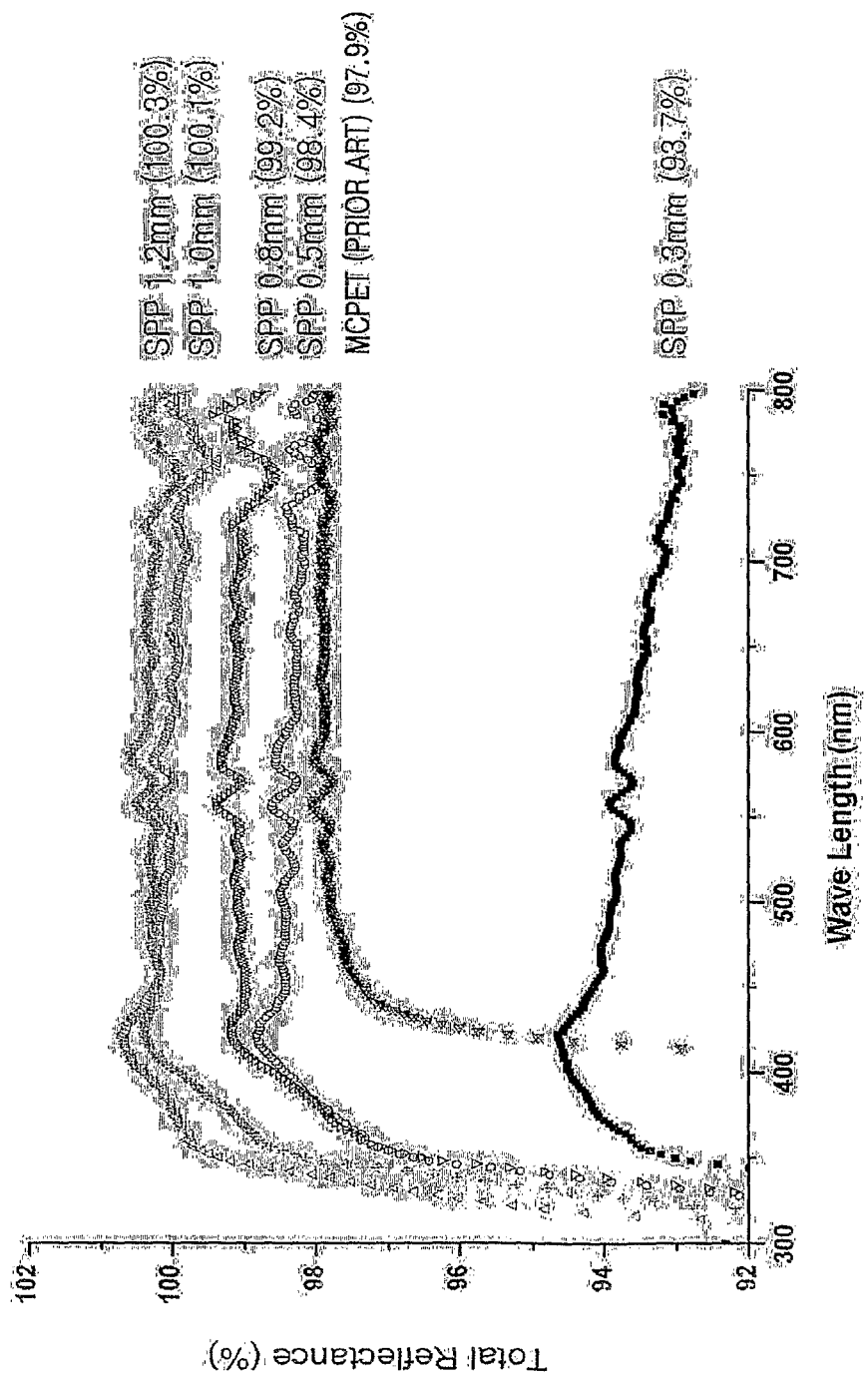
FIG. 14 is a graph showing the total reflectance of a conventional MCPET product and reflectors having various thicknesses manufactured according to an embodiment of what is described herein.

FIG. 14 is a graph showing the total reflectance of a conventional MCPET product and reflectors formed of SPP (polypropylene) having various thicknesses manufactured according to an embodiment of what is described herein. Table 4 below shows the initial thickness of the SPP (polypropylene) materials before the extension and the final thickness of the reflectors after the extension.

TABLE 4

| Product Classification | Initial Thickness Before Extension | Final Thickness After Extension |
| --- | --- | --- |
| SPP (polypropylene) 0.3 | 0.75 mm | 0.3 mm |
| SPP (polypropylene) 0.5 | 1.25 mm | 0.5 mm |
| SPP (polypropylene) 0.8 | 2.0 mm | 0.8 mm |
| SPP (polypropylene) 1.0 | 2.5 mm | 1.0 mm |
| SPP (polypropylene) 1.2 | 3.0 mm | 1.2 mm |

Referring to FIG. 14, the conventional MCPET product of Furukawa has a thickness of 0.94 mm and a total reflectance of 97.9% in the wavelength range of 550 nm at which visual cells are most excited. However, since each of the reflectors manufactured using the low temperature extension method according to the present invention with only a 0.5 mm thickness has a total reflectance higher than that of the conventional MCPET reflector, the thickness can be greatly reduced compared to the conventional product. Thus, a BLU (back light unit) of an LCD including the reflector of can be made compact. Also, since a high total reflectance of over 98% can be obtained with only a thickness of 0.5 mm, the reflector of the present invention can be used for not only TVs but also computer? monitors. Referring to the graph of FIG. 14, the SPP 1.2 mm product of the present invention can obtain a total reflectance of 100.3%, and thus the brightness of an LCD product including the SPP 1.2 mm product can be greatly improved.

Figure 15:
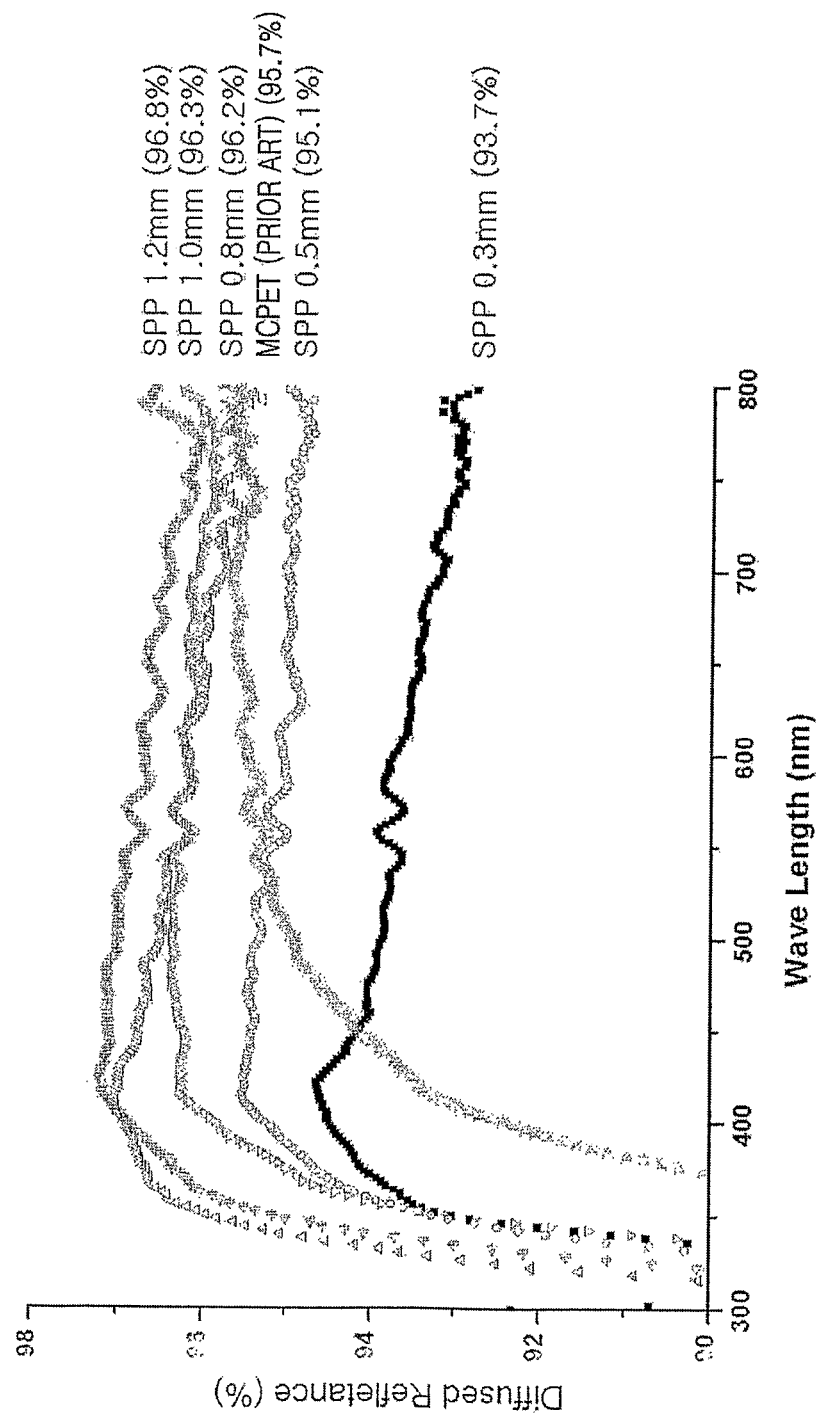
FIG. 15 is a graph showing the diffuse reflectance of a conventional MCPET product and reflectors having various thicknesses manufactured according to an embodiment of what is described herein.

FIG. 15 is a graph showing the diffuse reflectance of the conventional MCPET product and the reflectors having various thicknesses manufactured according to an embodiment of what is described herein.

In order that the entire area of an LCD screen has a uniform brightness, a reflector having a superior diffuse reflectance is needed. Referring to FIG. 15, a reflector SPP (stretched polypropylene) having a thickness of 0.8 mm or more that is low-temperature extended using the reflector manufacturing method has a diffuse reflectance higher than that of the conventional MCPET (Furukawa) 0.94 mm product. Also, it can be seen that even an SPP 0.5 mm product has a diffuse reflectance that is almost similar to that of the conventional MCPET product, in the wavelength range of 550 nm.

Thus, a reflector manufactured using the low temperature extension method can obtain a significantly higher reflectance at the same thickness than a conventional MCPET product having maximal reflectance. Even when the thickness is reduced from 0.94 mm to 0.5 mm, the substantially same reflectance can be obtained.

The above-described embodiment of what is described herein can be modified as follows.

Although in the above embodiment the orientation layers are arranged in a single predetermined direction only by performing mono-axial extension in one direction, the orientation layers can be arranged together in the predetermined direction and a direction perpendicular to the predetermined direction by performing biaxial extension for the extension in both the predetermined direction and the direction perpendicular to the predetermined direction (for example, biaxial extension).

Also, although in the above embodiment a plurality of orientation layers are arranged in the amorphous region as the crystalline plastic is extended, the orientation layers can be arranged in a thickness direction in which the crystalline plastic is pressed using a deep drawing process. That is, any structure in which orientation layers are formed in an amorphous region using a variety of methods is within the scope of what is described herein.

While disclosures provided herein have been particularly shown and described with reference to preferred embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of what is described herein as defined by the following claims.

The invention claimed is:

1. A reflector that reflects incident light, the reflector comprising:
   a plurality of crystal regions and a plurality of oriented amorphous layers,
      wherein the plurality of the crystal regions are randomly distributed throughout the reflector, and the plurality of the oriented amorphous layers are arranged in substantially parallel to one another.

2. The reflector of claim 1, wherein the oriented amorphous layers are extended in a predetermined direction.

3. The reflector of claim 2, wherein the predetermined direction is substantially perpendicular to a thickness direction of the reflector.

4. The reflector of claim 1, wherein the crystal region and the amorphous region includes a polyester family or polyolefin family.

5. The reflector of claim 1, wherein the reflector has a reflectance of 95% or more.

6. The reflector of claim 1, further comprising a UV stabilizer.

7. The reflector of claim 6, wherein the content of the UV stabilizer is 0.05-5 wt %.

8. The reflector of claim 6, wherein the UV stabilizer comprises an organic-based light stabilizer or an inorganic-based light stabilizer.

\* \* \* \* \*